US008848098B2

United States Patent
Satou et al.

(10) Patent No.: US 8,848,098 B2
(45) Date of Patent: Sep. 30, 2014

(54) IMAGING APPARATUS, IMAGING METHOD, AND PROGRAM

(75) Inventors: Daisuke Satou, Kanagawa (JP); Atsushi Ueda, Tokyo (JP); Jun Minakuti, Tokyo (JP)

(73) Assignee: Sony Corporation, Tokyo (JP)

( * ) Notice: Subject to any disclaimer, the term of this patent is extended or adjusted under 35 U.S.C. 154(b) by 24 days.

(21) Appl. No.: 13/609,549

(22) Filed: Sep. 11, 2012

(65) Prior Publication Data

US 2013/0083237 A1 Apr. 4, 2013

(30) Foreign Application Priority Data

Sep. 29, 2011 (JP) ................................ 2011-215021

(51) Int. Cl.
*H04N 5/235* (2006.01)
*H04N 9/68* (2006.01)
*H04N 9/64* (2006.01)

(52) U.S. Cl.
CPC ............. *H04N 9/643* (2013.01); *H04N 5/2351* (2013.01); *H04N 9/68* (2013.01)
USPC ........................................................ 348/362

(58) Field of Classification Search
USPC ...................................... 348/362, 221.1, 364
See application file for complete search history.

(56) References Cited

U.S. PATENT DOCUMENTS

| | | | | |
|---|---|---|---|---|
| 6,924,841 B2 * | 8/2005 | Jones | ............................. | 348/294 |
| 7,397,588 B2 * | 7/2008 | Sloan et al. | .................... | 358/520 |
| 7,916,158 B2 * | 3/2011 | Aoki et al. | ..................... | 345/690 |
| 8,089,548 B2 * | 1/2012 | Ogura et al. | ............. | 348/333.01 |
| 8,493,500 B2 * | 7/2013 | Doepke et al. | ................ | 348/362 |
| 2003/0174216 A1 * | 9/2003 | Iguchi et al. | ................. | 348/223.1 |
| 2005/0168596 A1 * | 8/2005 | Ito et al. | ................... | 348/222.1 |
| 2009/0027545 A1 * | 1/2009 | Yeo et al. | ....................... | 348/362 |
| 2009/0167872 A1 * | 7/2009 | Nakami | ....................... | 348/207.1 |
| 2010/0157112 A1 * | 6/2010 | Miyagi | .......................... | 348/242 |
| 2010/0302384 A1 * | 12/2010 | Sawada | ....................... | 348/208.4 |
| 2011/0141302 A1 * | 6/2011 | Hoshuyama | ................ | 348/222.1 |
| 2011/0216189 A1 * | 9/2011 | Nagamine et al. | ............. | 348/135 |

FOREIGN PATENT DOCUMENTS

JP 2004-023347 A 1/2004

\* cited by examiner

*Primary Examiner* — Aung S Moe
*Assistant Examiner* — Amy Hsu
(74) *Attorney, Agent, or Firm* — Sony Corporation

(57) ABSTRACT

An imaging apparatus includes an image analysis unit obtaining brightness information for respective hue regions from an image signal of a picked-up image and an exposure control unit carrying out exposure control based on the brightness information obtained in the image analysis unit.

7 Claims, 9 Drawing Sheets

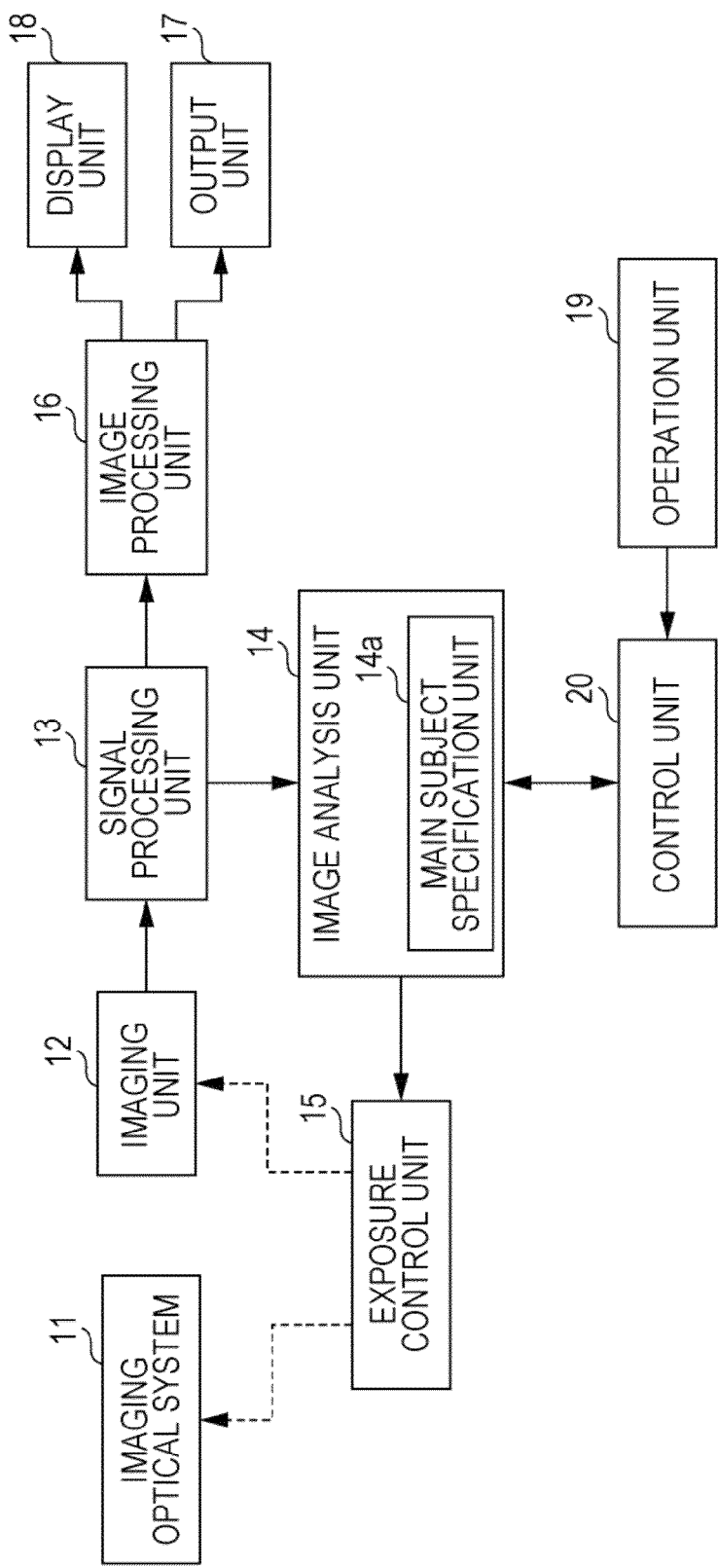

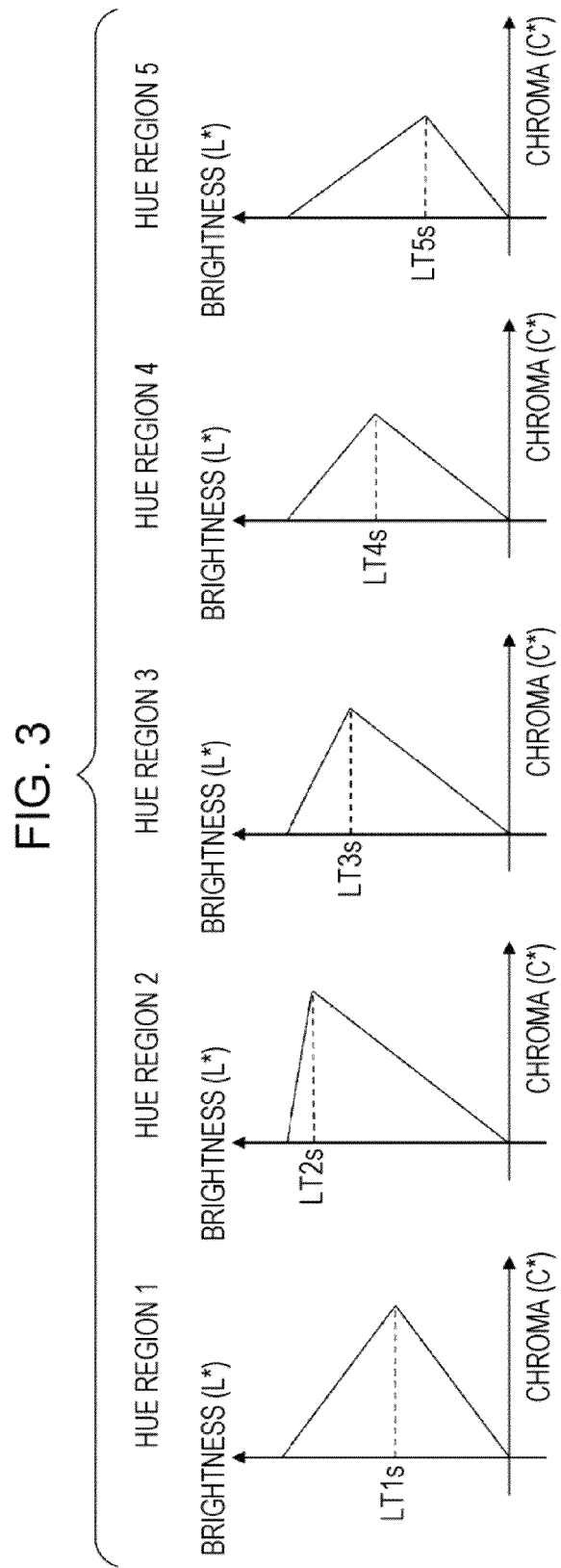

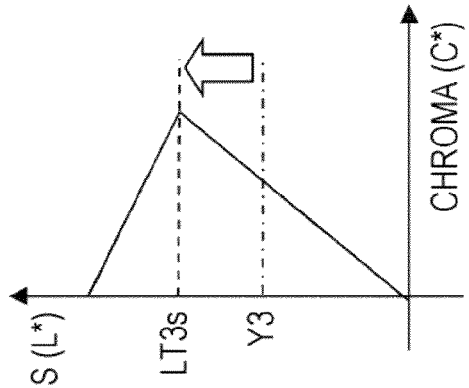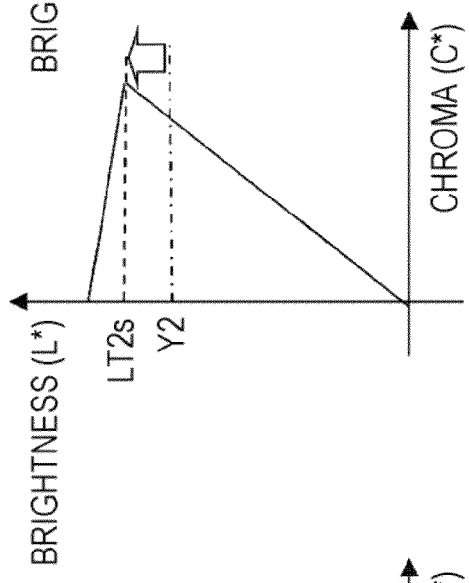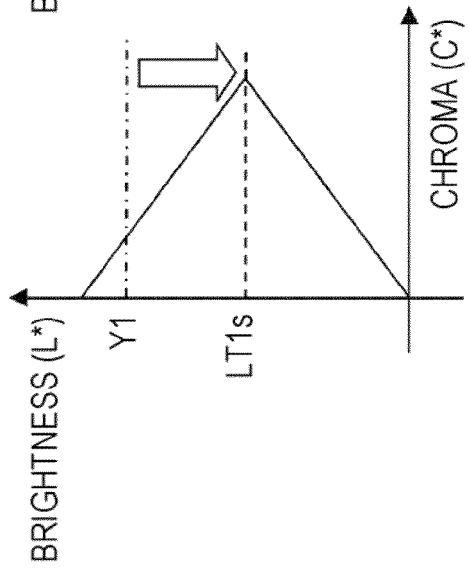

IMAGING APPARATUS, IMAGING METHOD, AND PROGRAM

CROSS-REFERENCE TO RELATED APPLICATION

The present application claims priority from Japanese Patent Application No. JP 2011-215021 filed in the Japanese Patent Office on Sep. 29, 2011, the entire content of which is incorporated herein by reference.

BACKGROUND

The present technology relates to an imaging apparatus, an imaging method, and a program that can optimize the chroma of a picked-up image.

In imaging apparatuses in the past, image processing is carried out to have predetermined color reproduction characteristics for an image signal of a picked-up image. In image processing, processing is carried out to enable obtainment of an image of predetermined color reproduction characteristics for an image taken in standard imaging conditions. Therefore, when a picked-up image has imaging conditions different from standard imaging conditions, it is difficult to obtain an image having desired color reproduction characteristics. For example, in a case of carrying out image processing to a picked-up image obtained by taking a high chroma subject in bright sunlight, there is a possibility of difficulty in appropriate expression of gradations as the image signal becomes saturated in parts of high chroma colors. Therefore, in Japanese Unexamined Patent Application Publication No. 2004-23347, an image signal after imaging is analyzed in an image analysis section and the image signal is corrected based on the analysis result, thereby allowing constant obtainment of a good image taken in whatever photographic scene or photographic conditions.

SUMMARY

When carrying out correction of an image signal based on an analysis result of the image signal after imaging, in a case of a saturated image signal after imaging, it is difficult to obtain a good picked-up image even when carrying out correction of the image signal based on the analysis result. For example, in a case that an image signal is saturated when imaging a high chroma subject, chroma information is lost before carrying out analysis or correction, so that it is difficult to obtain a picked-up image of appropriate chroma even when carrying out correction of the image signal based on the analysis result.

In addition, while the analysis is carried out using a color difference signal in Japanese Unexamined Patent Application Publication No. 2004-23347, there is a possibility that the color difference signal used for analysis does not correctly express a color difference of the subject when the image signal is saturated at the time of imaging.

It is desirable to provide an imaging apparatus, an imaging method, and a program that can optimize chroma of a picked-up image.

According to an embodiment of the present technology, an imaging apparatus includes an image analysis unit obtaining brightness information for each hue regions from an image signal of a picked-up image and an exposure control unit carrying out exposure control based on the brightness information obtained in the image analysis unit.

In an embodiment of the present technology, brightness information is obtained for each hue region from an image signal of a picked-up image, for example, an image signal of a main subject. Based on this brightness information thus obtained, exposure control is carried out, for example, to enhance the chroma of the main subject. The hue region may also be segmented based on the brightness for maximum chroma, and may also be segmented in accordance with the color of the main subject specified by the main subject specification unit. The image analysis unit may also generate brightness information only for the hue region including the color of the main subject specified by the main subject specification unit. The exposure control unit calculates an amount of correction to have the brightness for maximum chroma for each hue region based on the brightness information for each hue region and carries out exposure control in accordance with the amount of correction thus calculated and a ratio of the image contained in each hue region. When configuration information of a color space is obtained, exposure control in accordance with the color space shown by the configuration information is carried out.

According to another embodiment of the present technology, an imaging method includes obtaining brightness information for respective hue regions from an image signal of a picked-up image and carrying out exposure control based on the brightness information thus obtained.

According to still another embodiment of the present technology, a program causes a computer to execute exposure control of an imaging apparatus, the program causing the computer to execute the procedures including obtaining brightness information for respective hue regions from an image signal of a picked-up image and calculating an exposure control value based on the brightness information thus obtained.

The program according to an embodiment of the present technology is a program capable of being provided by, for example, a storage medium, such as an optical disk, a magnetic disk, and a semiconductor memory, or a communication medium, such as a network, in a computer readable format for a general purpose computer capable of executing various program codes, for example. By providing such program in a computer readable format, processing in accordance with the program on a computer is provided.

According to an embodiment of the present technology, brightness information is obtained for each hue region from an image signal of a picked-up image, and based on this brightness information thus obtained, exposure control is carried out. Therefore, exposure control is carried out, for example, to enhance the chroma of a desired subject to enable optimization of chroma of a picked-up image.

BRIEF DESCRIPTION OF THE DRAWINGS

FIG. 1 illustrates an example of a schematic configuration of an imaging apparatus;

FIG. 3 illustrates brightness (in a case of sRGB color space) for maximum chroma;

FIGS. 8A, 8B, and 8C illustrate examples of a brightness target in a case of selecting sRGB color space.

DETAILED DESCRIPTION OF EMBODIMENTS

Figure 2A:
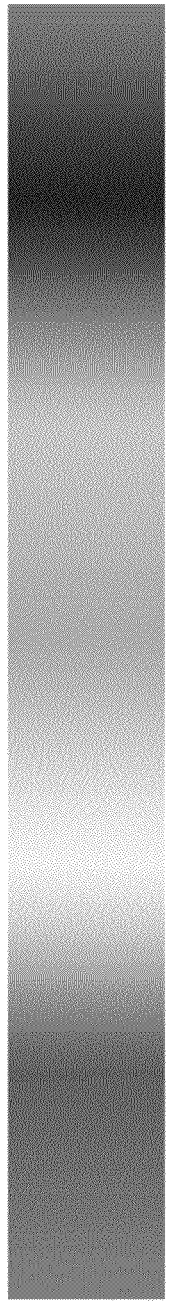
FIGS. 2A and 2B illustrate segmentation of a hue region into a plurality of regions.

A description is given below to embodiments of the present technology. The description is given in the following order.
1. Configuration of Imaging Apparatus
2. Behavior of Imaging Apparatus
3. Another Behavior of Imaging Apparatus <1. Configuration of Imaging Apparatus>

FIG. 1 illustrates an example of a schematic configuration of an imaging apparatus according to an embodiment. An imaging apparatus 10 is provided with an imaging optical system 11, an imaging unit 12, a signal processing unit 13, an image analysis unit 14, an exposure control unit 15, an image processing unit 16, an output unit 17, a display unit 18, an operation unit 19, and a control unit 20.

The imaging optical system 11 is provided with optical components, such as a zoom lens, a focus lens, and an aperture mechanism carrying out light amount regulation.

The imaging unit 12 is configured using a solid-state imaging device, such as a CCD (charge coupled device) or a CMOS (complementary metal oxide semiconductor), for example. The imaging device converts a subject image formed on an imaging surface by the imaging optical system 11 into an electrical signal to output it to the signal processing unit 13.

The signal processing unit 13 carries out preprocessing, such as noise removal processing, gain adjustment, and A/D conversion processing, to the imaging signal supplied from the imaging unit 12. Further, the signal processing unit 13 carries out camera signal processing, such as gamma correction processing and white balance adjustment, to the image signal obtained by carrying out the preprocessing. The signal processing unit 13 outputs the image signal after processing to the image analysis unit 14 and the image processing unit 16.

The image analysis unit 14 carries out analysis of the hue and the brightness using the image signal outputted from the signal processing unit 13 to obtain brightness information for each hue region, and outputs it to the exposure control unit 15. The image analysis unit 14 carries out analysis of the hue and the brightness for an image region of a main subject based on a control signal from the control unit 20 described later. For example, the image analysis unit 14 has a main subject specification unit 14a, and the main subject specification unit 14a defines a region to optimize the chroma set by a user or a region detected by face detection or the like as the image region of the main subject. The main subject specification unit 14a may also be equipped in the control unit 20 described later and may also be equipped independent from the image analysis unit 14 and the control unit 20.

The exposure control unit 15 determines an amount of exposure correction based on the analysis result supplied from the image analysis unit 14, and carries out exposure control to enable obtainment of a high chroma image taken by controlling the imaging optical system 11 and the imaging unit 12 based on the amount of exposure correction thus determined.

The image processing unit 16 carries out coding-decoding processing of a picked-up image. The image processing unit 16 carries out resizing processing to make the picked-up image into an image compatible with a display size of the display unit 18 and outputs the image signal after resizing to the display unit 18.

The output unit 17 carries out processing to output the signal outputted from the image processing unit 16 to an external apparatus in a predetermined format. The output unit 17 carries out processing to store the signal outputted from the image processing unit 16 in a storage medium in a predetermined format.

The display unit 18 displays a picked-up image based on the signal outputted from the image processing unit 16. The display unit 18 carries out display to set a behavior of the imaging apparatus 10 and the like and display to show a behavioral state of the imaging apparatus 10 and the like.

The operation unit 19 is configured with an operation button, a touch screen equipped on a screen of the display unit 18, and the like. The operation unit 19 generates an operational signal in accordance with a user operation and supplies it to the control unit 20.

The control unit 20 is configured with, for example, a CPU (central processing unit), a ROM (read only memory), a RAM (random access memory), a flash memory, and the like. In the ROM and the flash memory, a program executed by the CPU and various types of data are stored. The RAM is used for a working memory or the like. The CPU executes the program stored in the memory to control each unit such that a behavior of the imaging apparatus 10 is run in accordance with a user operation based on the various types of data stored in the memory or the operational signal supplied from the operation unit 19. The program executed in the control unit 20 may be stored in a removable storage medium, such as an optical disk and a semiconductor memory card, to be provided to the imaging apparatus and may also be downloaded into the imaging apparatus via a network, such as a LAN and the Internet.

<2. Behavior of Imaging Apparatus>

It is considered that a picked-up image has different brightness for maximum chroma dependent on the hue. Therefore, in the imaging apparatus, the brightness for maximum chroma is preset for each hue region as an exposure control target value to control the brightness at the time of imaging to enhance the chroma of a desired subject.

Figure 2B:
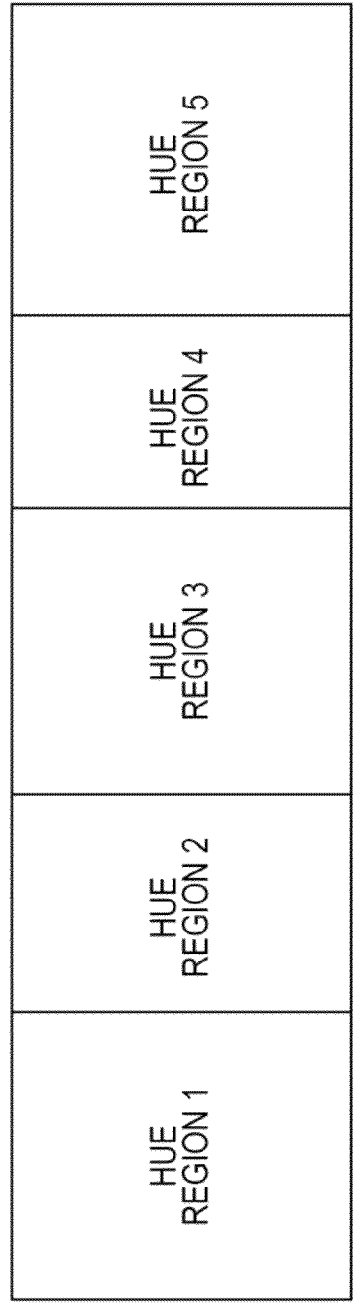

The brightness for maximum chroma for each hue region is different from color spaces. FIGS. 2A and 2B illustrate a case of segmenting the hue region based on the brightness for maximum chroma. FIGS. 2A and 2B illustrate a case of segmenting the hue region illustrated in FIG. 2A into five regions illustrated in FIG. 2B by collecting colors of approximate brightness for maximum chroma.

Figure 4:
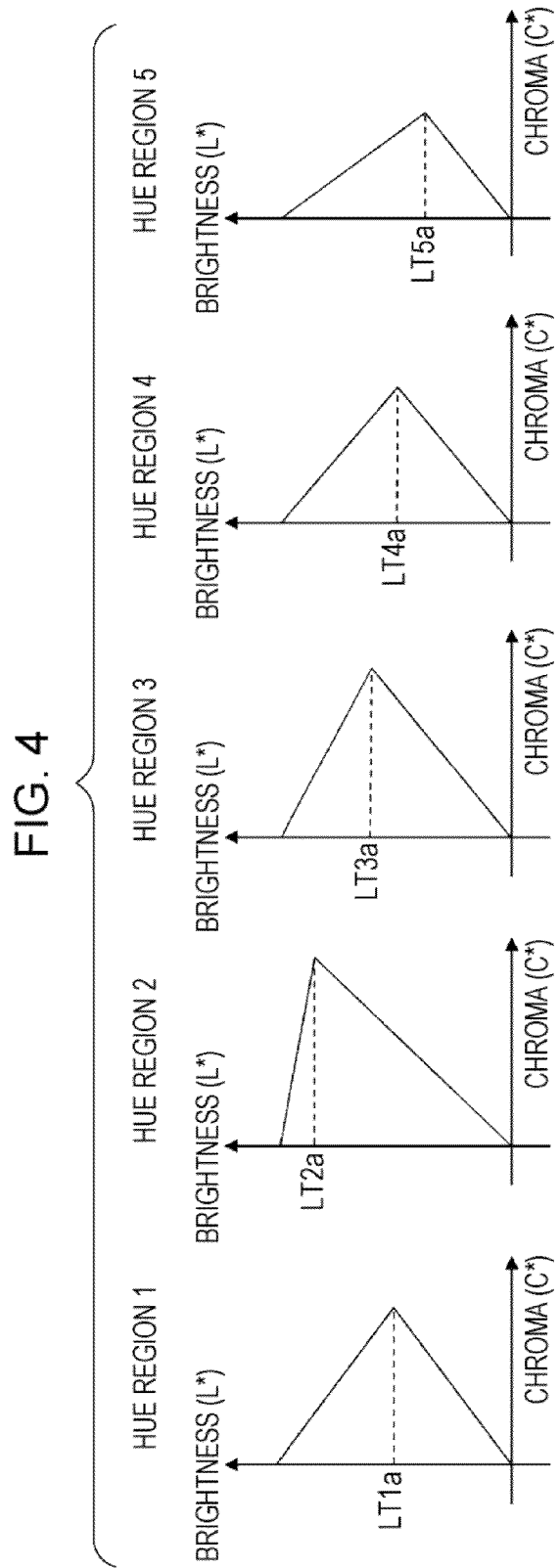
FIG. 4 illustrates brightness (in a case of Adobe RGB color space) for maximum chroma.

The brightness for maximum chroma in each hue region thus segmented is different dependent on the color space as illustrated in FIGS. 3 and 4. FIG. 3 illustrates brightness for maximum chroma for each hue region in sRGB, which is a color space defined by the IEC (International Electrotechnical Commission). For example, in hue region 1, when the brightness is $LT1s$, the chroma in hue region 1 becomes maximum. In hue region 2, when the brightness is $LT2s$, the chroma in hue region 2 becomes maximum. Similarly, in hue regions 3, 4, and 5, when the brightness is $LT3s$, $LT4s$, and $LT5s$, the chroma becomes maximum. FIG. 4 illustrates the brightness for maximum chroma for each hue region in Adobe RGB, which is a color space defined by Adobe Systems Inc. For example, in hue region 1, when the brightness is $LT1a$, the chroma in hue region 1 becomes maximum. In hue region 2, when the brightness is $LT2a$, the chroma in hue region 2 becomes maximum. Similarly, in hue regions 3, 4, and 5, when the brightness is $LT3a$, $LT4a$, and $LT5a$, the chroma becomes maximum. Further, $LT2s$ in sRGB color space is brighter than LT2a in Adobe RGB color space, and similarly LT3s and LT4s are brighter than LT3a and LT4a, respectively.

In such a manner, the brightness for maximum chroma for each hue region is different dependent on the color space, so that the imaging apparatus 10 has preset a target that is the brightness for maximum chroma for each color space.

Figure 5:
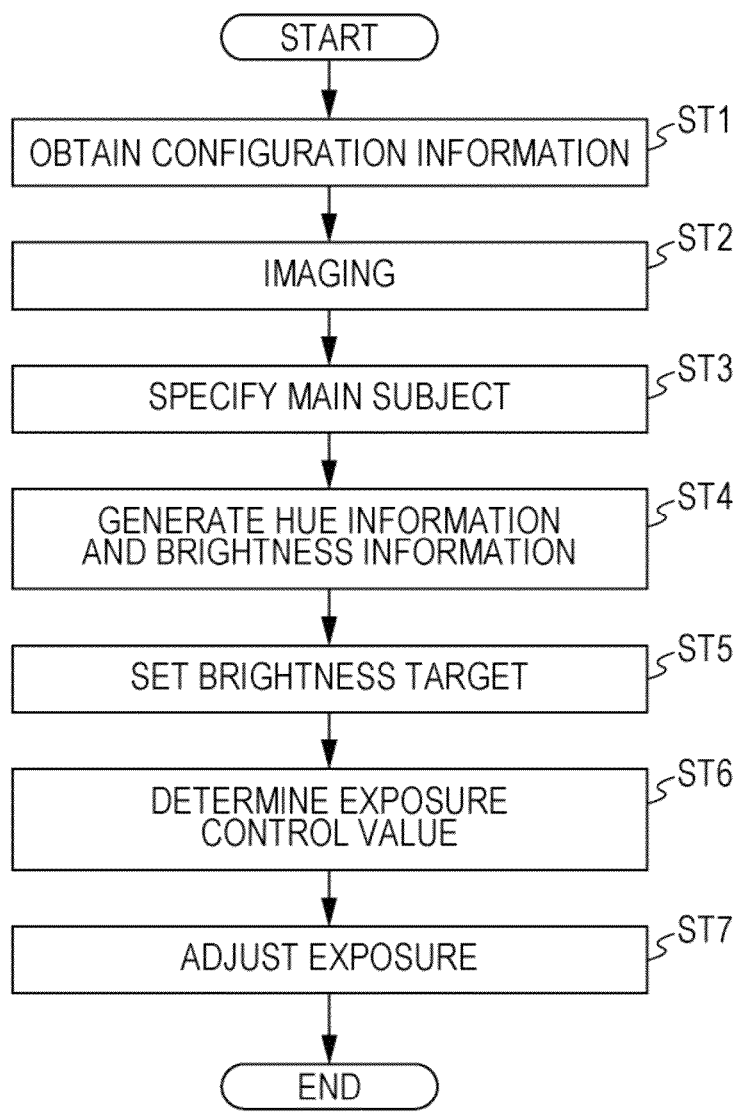
FIG. 5 is a flowchart showing an exposure control behavior in an imaging apparatus.

FIG. 5 is a flowchart showing an exposure control behavior in the imaging apparatus. In step ST1, the imaging apparatus 10 obtains the configuration information. The control unit 20 of the imaging apparatus 10 accepts a user operation based on an operational signal from the operation unit 19, thereby obtaining the configuration information. For example, the control unit 20 obtains the configuration information, such as which color space to be used, and goes on to step ST2.

In step ST2, the imaging apparatus 10 carries out imaging. The control unit 20 of the imaging apparatus 10 controls each unit to start an imaging behavior and goes on to step ST3.

In step ST3, the imaging apparatus 10 specifies a main subject. The main subject specification unit 14a of the imaging apparatus 10 specifies a main subject subjected to image analysis. The main subject specification unit 14a carries out detection of a main subject in the picked-up image to specify the main subject thus detected as a subject for an image analysis target and goes on to step ST4. For example, face detection is carried out to specify a main subject and the face thus detected is defined as the subject for an image analysis target. In addition, to specify the subject, a subject instructed by a user may also be the main subject. Further, an image in a region instructed by a user or an image in a color instructed by a user may also be the image of the main subject.

In step ST4, the imaging apparatus 10 generates the hue information and the brightness information. The image analysis unit 14 of the imaging apparatus 10 generates the hue information and the brightness information of the region of the subject specified in step ST3. The image analysis unit 14 classifies the pixels in the region of the specified subject into each preset hue region and calculates a pixel frequency of each hue region. For example, the image analysis unit 14 determines which hue region contains the hue for pixels having the chroma of not less than a predetermined threshold THc and carries out sorting of the pixels based on the determination result, thereby calculating the number of pixels contained in each hue region. The threshold THc is set to allow elimination of pixels having low chroma and difficult to determine the hue.

The image analysis unit 14 also calculates a statistic of the brightness of the pixels contained in the region for each hue region to define it as the brightness information. For example, the image analysis unit 14 calculates an average value of the brightness of the pixels contained in the region to define it as the brightness information. The statistic may also be a median, a mode, and the like to be used as the brightness information.

In such a manner, the image analysis unit 14 generates the hue information and the brightness information in the specified subject region and goes on to step ST5.

In step ST5, the imaging apparatus 10 sets a brightness target. The exposure control unit 15 of the imaging apparatus 10 sets the brightness for maximum chroma for each hue region as the target in the color space selected by a user, and goes on to step ST6. In a case of presetting the brightness target in each hue region described above and illustrated in FIGS. 3 and 4, the exposure control unit 15 has only to select the brightness target corresponding to the color space selected by a user, so that the processing is facilitated.

In step ST6, the imaging apparatus 10 determines the exposure control value. The exposure control unit 15 of the imaging apparatus 10 determines the amount of correction for each hue region from the brightness information generated in step ST4 and the brightness target determined in step ST5. Further, the exposure control unit 15 carries out weighting to the amount of correction determined for each hue region based on the hue information generated in step ST4, and determines the exposure control value from the amount of correction after weighting and goes on to step ST7.

In step ST7, the imaging apparatus 10 carries out exposure adjustment. The exposure control unit 15 of the imaging apparatus 10 adjusts, for example, the aperture of the imaging optical system 11, the storage time of the electric charge read out of the imaging device in the imaging unit 12, and the like based on the exposure control value determined in step ST6. The ISO speed may also be switched in accordance with the exposure control value.

Figure 6:
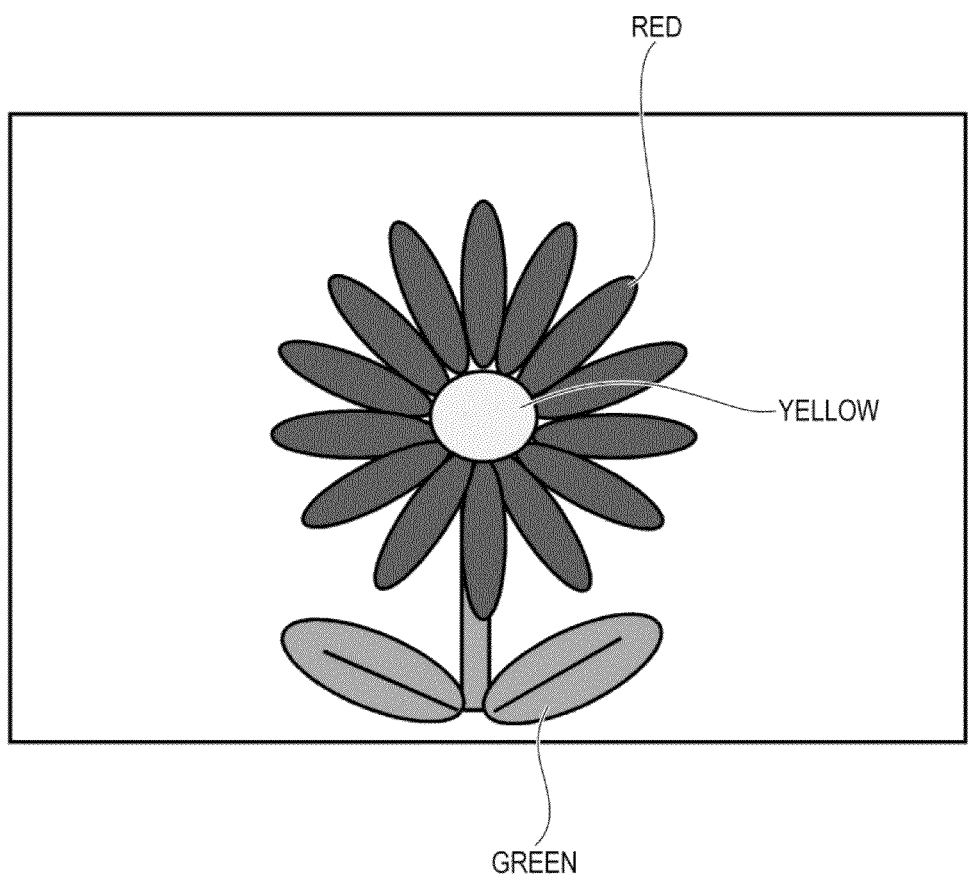
FIG. 6 illustrates an example of a picked-up image.

A specific behavior of the imaging apparatus is exemplified below. FIG. 6 illustrates an example of a picked-up image. The main subject specification unit 14a of the imaging apparatus 10 specifies the main subject from the picked-up image in FIG. 6. A description is given below to a case of specifying the image region of the flower as a main subject region by the main subject specification unit 14a.

The image analysis unit 14 compares the chroma with the threshold THc for each pixel in the flower image region. The image analysis unit 14 also determines which hue region contains the pixels having chroma higher than the threshold THc and carries out sorting of the pixels.

Figure 7:
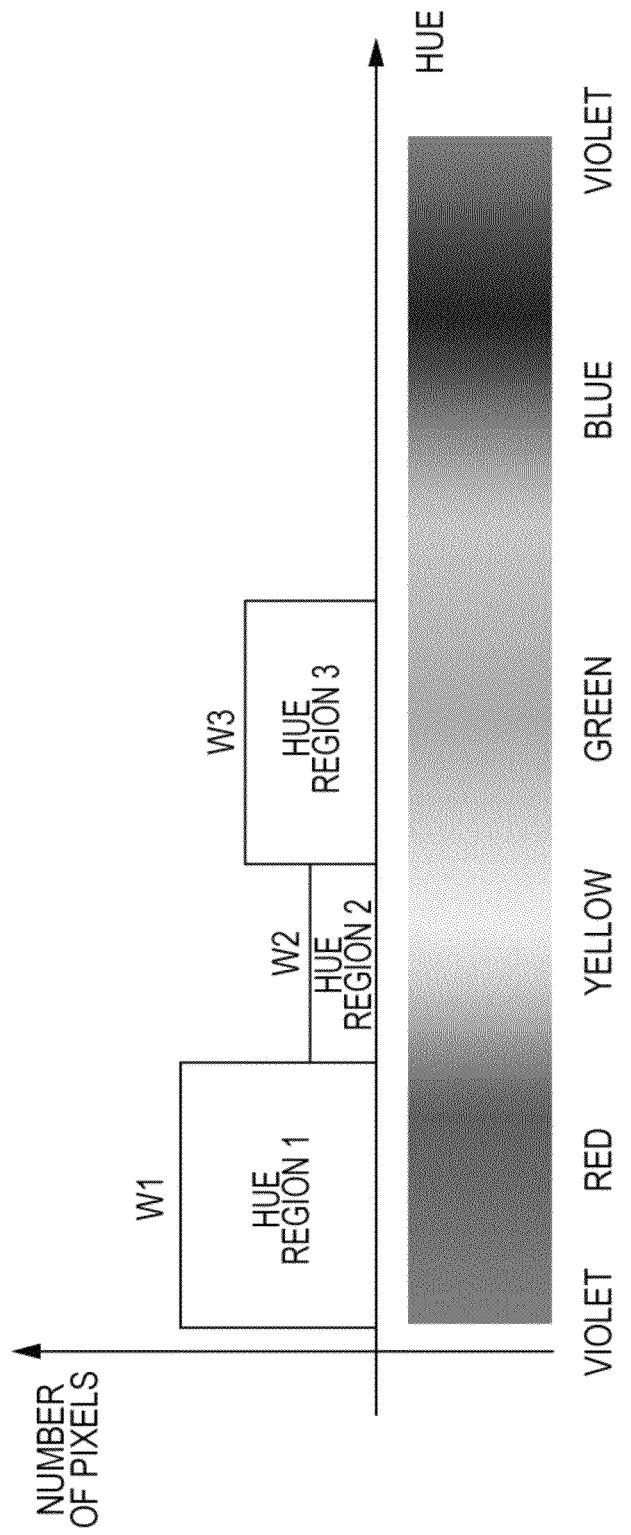
FIG. 7 illustrates an example of a result of pixel classification into hue regions.

FIG. 7 illustrates an example of the result of pixel classification into the hue regions. As illustrated in FIG. 7, the numbers of pixels in hue region 1 containing the color of a corolla and hue region 3 containing the colors of leaves and a stem are large, and the number of pixels in hue region 2 containing the color of the parts of stamens and pistils becomes small. The hue regions 4 and 5 of colors not contained in the main subject have the numbers of pixels as "0". Here, the number of pixels in hue region 1 is defined as "W1", the number of pixels in hue region 2 as "W2", and the number of pixels in hue region 3 as "W3".

The image analysis unit 14 calculates a statistic of the brightness of the pixels contained in the region for each hue region to define it as the brightness information. The image analysis unit 14 defines, for example, an average value "Y1" of the brightness of the pixels contained in hue region 1 as the statistic. The image analysis unit 14 also uses an average value "Y2" of the brightness of the pixels contained in hue region 2 and an average value "Y3" of the brightness of the pixels contained in hue region 3 as the respective statistics.

The exposure control unit 15 sets the brightness for maximum chroma in the color space selected by a user for the brightness target. FIGS. 8A, 8B, and 8C illustrate the brightness targets when, for example, sRGB color space is selected. As described above, the colors contained in the main subject are any of hue regions 1, 2, and 3, and the colors in hue regions 4 and 5 are not contained in the main subject, so that FIGS. 8A, 8B, and 8C illustrate the targets for hue regions 1, 2, and 3.

The exposure control unit 15 calculates an amount Ev1 of correction in hue region 1 such that the average value "Y1" of the brightness becomes the brightness of the target "LT1s" in hue region 1 illustrated in FIG. 8A. For example, a table showing relationship between the difference of the brightness to the target and the amount of correction is generated in advance to enable obtainment of the amount Ev1 of correction from the table using the difference between the average value "Y1" of the brightness and the target "LT1s".

Similarly, the exposure control unit 15 calculates an amount Ev2 of correction to define an average value "Y2" of the brightness as the brightness of the target "LT2s" in hue region 2 illustrated in FIG. 8B. The exposure control unit 15 also calculates an amount Ev3 of correction to define an average value "Y3" of the brightness as the brightness of the target "LT3s" in hue region 3 illustrated in FIG. 8C.

Further, the exposure control unit 15 carries out weighting in accordance with a ratio of the image contained in the hue regions, that is, a ratio of the number of pixels for the amount Ev1 of correction calculated for hue region 1, the amount Ev2 of correction calculated for hue region 2, and the amount Ev3 of correction calculated for hue region 3, and determines an exposure control value Evt. Formula (1) expresses a formula to calculate the exposure control value.

$$Evt=((Ev1\times W1)+(Ev2\times 3W2)+(Ev3\times W3))/(W1+W2+W3) \quad (1)$$

By using the exposure control value thus determined for exposure adjustment, it becomes possible to prevent an image signal from being saturated in the high chroma color parts and it is enabled to optimize the chroma of the picked-up image. Accordingly, a pop and vivid picked-up image can be generated easily by, for example, emphasizing the chroma of the main subject.

In addition, since the segmentation of hue regions is carried out by collecting hues of approximate brightness for maximum chroma, exposure control is carried out using the brightness for maximum chroma in a desired hue region as the target, thereby enabling the chroma of the color contained in the desired hue region to be approximated to maximum.

Further, since the image signal can be prevented from becoming saturated, a color difference signal becomes a signal correctly expressing the color difference of the subject, so that desired color processing or the like can be carried out correctly when carrying out color processing or the like using a color difference signal.

<3. Another Behavior of Imaging Apparatus>

Figure 9A:
FIGS. 9A, 9B, and 9C illustrate examples of a case of carrying out segmentation of hue regions in accordance with a main subject.
Figure 9B:
Figure 9C:
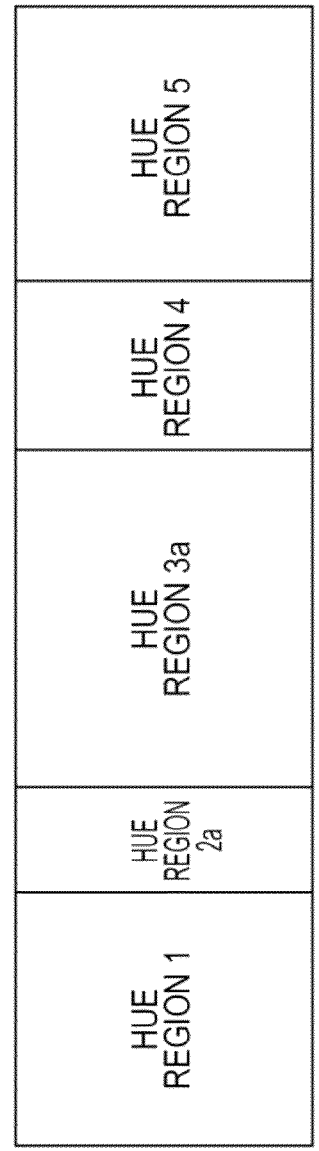

While the above embodiment describes an example of a case of carrying out segmentation of hue regions in accordance with the brightness for maximum chroma, the segmentation of hue regions may also be carried out in accordance with a main subject. For example, when carrying out face detection for detection of a main subject, segmentation is carried out into a hue region including a color of the face and one or a plurality of hue regions not including the color of the face. For example, while the hue region illustrated in FIG. 9A is segmented into five regions as illustrated in FIG. 9B based on the brightness for maximum chroma in the above behavior, the hue region 2 including the color of the face is defined as hue region 2a showing a range of the color of the face as illustrated in FIG. 9C. In association with the modification in hue region 2, hue region 3 is defined as hue region 3a. In addition, when defining a subject instructed by a user as the main subject for the image analysis target or when defining an image in a region instructed by a user or an image in a color specified by a user as the image analysis target, the segmentation of hue regions may also be carried out using the instructed color of the subject, the color of the image in the instructed region, the specified color, or the like as the standard. For example, when the subject or the region specified by a user is the sky or a sea, a range of blue or light blue may be set as a range of one hue region. When the hue region is segmented in accordance with the main subject in such a manner, the exposure control is carried out based on the brightness information in the hue region corresponding to the main subject, thereby enabling further optimization of the chroma of the main subject.

When a hue region is segmented into a plurality of regions, the hue region with a wider region width is prone to have a larger number of pixels compared with a region with a narrower hue region. For example, when the main subject is a person wearing a shirt in yellow or green-based color, there is a possibility of carrying out the exposure control in accordance with the brightness in hue region 3a rather than the brightness in hue region 2a because the number of images in hue region 3a with the wider region width becomes more compared with the number of pixels in hue region 2a corresponding to the color of the face. Accordingly, the exposure control unit 15 may also carry out the weighting of the amount of correction calculated for each hue region considering not only the numbers of pixels in the hue regions but also the region widths. For example, when the region width in the hue region is ½ fold of the region width as the standard, the number of pixels is defined as 2 fold, and when the region width of the hue region is 2 fold, the number of pixels is defined as ½ fold, thereby correcting the number of pixels in the hue region in accordance with the region width of the hue region. By doing in such a manner, weighting is carried out in accordance with the number of pixels after correction, thereby enabling exposure control in accordance with the brightness in hue region 2a rather than the brightness of hue region 3a.

The calculation of the exposure control value is not limited to a case of using the amount of correction calculated for a plurality of hue regions and it is also possible to use an amount of correction in one hue region corresponding to the main subject as the exposure control value. In this case, it turns out to carry out exposure control focusing only on the chroma in one hue region corresponding to the main subject.

The series of processing described in this specification can be executed by hardware or software, or alternatively a combined configuration of both. When executing processing by software, a program storing the processing sequence is installed into a memory in a computer incorporated into dedicated hardware for execution. Alternatively, it is possible to execute by installing the program into a general purpose computer capable of executing various types of processing.

For example, the program can be stored in advance in a hard disk or a ROM (read only memory) as a storage medium. Alternatively, the program can be stored (recorded) temporarily or permanently in a removable storage medium, such as a flexible disk, a CD-ROM (compact disc read only memory), an MO (magneto optical) disk, a DVD (digital versatile disc), a magnetic disk, and a semiconductor memory card. Such removable storage medium is possible to be provided as so-called packaged software.

In addition, other than being installed from a removable storage medium into a computer, the program may also be transferred wireless or wired from a download site via a network, such as a LAN (local area network) and the Internet, to a computer. The computer can receive a program thus transferred and install it into a storage medium, such as a built-in hard disk.

Embodiments of the present technology should not be understood by limiting to the embodiments of the present technology described above. The embodiments of the technology disclose the present technology in the form of exemplification, and it is apparent that those skilled in the art can modify and substitute the embodiments without departing from the spirit of embodiments of the present technology.

That is, the substance of the present technology should be judged according to the embodiments of the present technology.

The imaging apparatus of an embodiment of the present technology can also be configured as follows.

(1) An imaging apparatus, including: an image analysis unit obtaining brightness information for each hue regions from an image signal of a picked-up image; and an exposure control unit carrying out exposure control based on the brightness information obtained in the image analysis unit.

(2) The imaging apparatus according to (1), wherein the exposure control unit carries out the exposure control enhancing chroma based on the brightness information.

(3) The imaging apparatus according to (1) or (2), further including: a main subject specification unit specifying a main subject in the picked-up image, wherein the image analysis unit obtains the brightness information from an image signal of the main subject, and the exposure control unit carries out the exposure control enhancing chroma of the main subject based on the brightness information.

(4) The imaging apparatus according to any one of (1) through (3), wherein the exposure control unit calculates an amount of correction to have brightness for maximum chroma for each of the hue regions based on the brightness information for each of the hue regions and carries out the exposure control in accordance with the amount of correction thus calculated and a ratio of the image contained in each hue region.

(5) The imaging apparatus according to any one of (1) through (4), wherein the image analysis unit carries out segmentation of the hue regions based on brightness for maximum chroma.

(6) The imaging apparatus according to any one of (1) through (4), wherein the image analysis unit carries out segmentation of the hue regions in accordance with a color of the main subject specified by the main subject specification unit.

(7) The imaging apparatus according to any one of (1) through (3), wherein the image analysis unit generates the brightness information only for the hue region including a color of the main subject specified by the main subject specification unit.

(8) The imaging apparatus according to any one of (1) through (7), wherein the exposure control unit obtains configuration information of a color space and carries out the exposure control in accordance with the color space shown in the configuration information.

What is claimed is:

1. An imaging apparatus, comprising:
an image analysis unit obtaining brightness information for respective hue regions from an image signal of a picked-up image;
an exposure control unit carrying out exposure control based on the brightness information obtained in the image analysis unit, wherein the exposure control unit carries out the exposure control enhancing chroma based on the brightness information; and
a main subject specification unit specifying a main subject in the picked-up image, wherein
the image analysis unit obtains the brightness information from an image signal of the main subject,
the exposure control unit carries out the exposure control enhancing chroma of the main subject based on the brightness information, and
the exposure control unit calculates an amount of correction to have brightness for maximum chroma for each of the hue regions based on the brightness information for each of the hue regions and carries out the exposure control in accordance with the amount of correction thus calculated and a ratio of the image contained in each hue region.

2. The imaging apparatus according to claim 1, wherein the image analysis unit carries out segmentation of the hue regions based on brightness for maximum chroma.

3. The imaging apparatus according to claim 1, wherein the image analysis unit carries out segmentation of the hue regions in accordance with a color of the main subject specified by the main subject specification unit.

4. The imaging apparatus according to claim 1, wherein the image analysis unit generates the brightness information only for the hue regions including a color of the main subject specified by the main subject specification unit.

5. The imaging apparatus according to claim 1, wherein the exposure control unit obtains configuration information of a color space and carries out the exposure control in accordance with the color space shown in the configuration information.

6. An imaging method, comprising:
obtaining brightness information for respective hue regions from an image signal of a picked-up image;
carrying out exposure control based on the brightness information thus obtained;
carrying out the exposure control enhancing chroma based on the brightness information; and
carrying out segmentation of the hue regions based on the brightness information for maximum chroma.

7. A non-transitory computer readable medium having stored thereon, a computer program having at least one code section executable by a computer, thereby causing the computer to perform steps comprising:
obtaining brightness information for respective hue regions from a first image signal of a picked-up image;
specifying a main subject in the picked-up image;
obtaining the brightness information from a second image signal of the main subject;
carrying out exposure control enhancing chroma of the main subject based on the brightness information; and
carrying out segmentation of the hue regions in accordance with a color of the main subject.

* * * * *